July 22, 1924.

R. RODRIAN 1,502,213

ELECTROLYTIC PROCESS FOR THE PRODUCTION OF SULPHIDES

Filed April 26, 1922

INVENTOR
Richard Rodrian
BY
Lotka, Kehlenbeck & Mathé
ATTORNEYS

Patented July 22, 1924.

1,502,213

UNITED STATES PATENT OFFICE.

RICHARD RODRIAN, OF NEW YORK, N. Y., ASSIGNOR TO RODRIAN ELECTROMETALLURGICAL CO., INCORPORATED, OF NEW YORK, N. Y., A CORPORATION OF DELAWARE.

ELECTROLYTIC PROCESS FOR THE PRODUCTION OF SULPHIDES.

Application filed April 26, 1922. Serial No. 556,720.

*To all whom it may concern:*

Be it known that I, RICHARD RODRIAN, a citizen of Germany, and resident of the borough of Manhattan, city, county, and State of New York, have invented certain new and useful Improvements in Electrolytic Processes for the Production of Sulphides, of which the following is a specification.

My present invention relates to the production of sulphides by electrolysis, from a solution of an alkaline hydrate or of an alkaline earth hydrate, in conjunction with sulfur used in finely-divided form.

Figure 1:
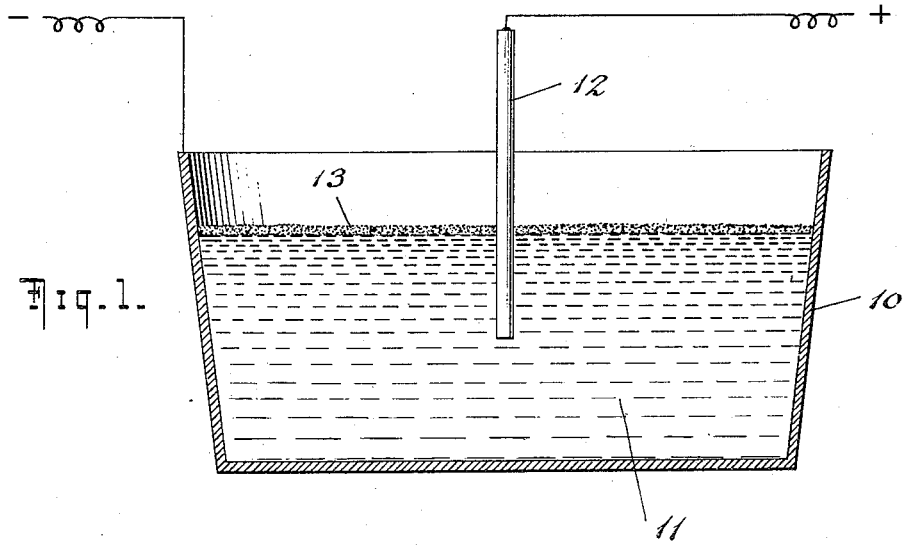
Figure 2:
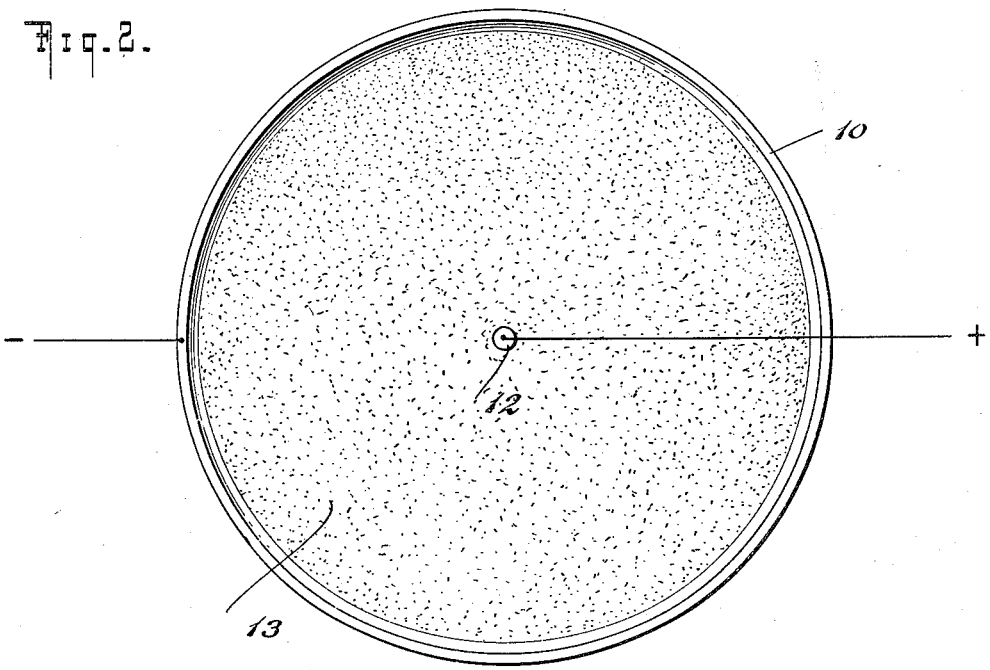

An apparatus suitable for carrying out my improved process is shown in the accompanying drawings, in which Fig. 1 is a vertical central section through the apparatus, and Fig. 2 is a plan view thereof.

The vessel or vat 10 may consist of metal, for instance iron or lead, and is adapted to contain the electrolyte 11, which is a solution of the hydrate of an alkali or of the hydrate of an alkaline earth, generally a concentrated solution. As examples, I may mention solutions of caustic soda, caustic potash, caustic lime, caustic ammonia, etc. The vessel 10 itself forms the negative electrode, being suitably connected with a source of electric current. The other terminal of such source is connected with the positive electrode or electrodes 12 consisting of a rod or rods dipping into the electrolyte 11 and made, for instance of iron or other metal, although other conductors (carbon) might be employed. While the current is passing through the electrolyte, I spread on the surface of such liquid, sulfur in a finely-divided condition, for instance flowers of sulfur, this layer of sulfur being indicated at 13. The electrolytic action causes the sulfur to become dissolved in the electrolyte, and this dissolved sulfur combines with the metal present in the material under treatment, and forms the desired sulphide or sulphides. Two different cases may occur:

The sulfur may combine with the metal of the alkaline electrolyte, so that the sulphide formed will be a sulphide of an alkali (or of an alkaline earth, if a solution of a hydrate of such earth is used as the electrolyte).

On the other hand, when it is desired to form the sulphide of a metal different from the metal of the electrolyte, and particularly when the sulphide of a heavy metal (iron, lead, copper, nickel, etc.) is to be obtained, this metal, or its oxid, in finely-divided form, is spread on the bottom of the vessel or vat, before the sulfur is spread on the surface of the electrolyte, such sulfur being added, as before, while the current is passing through the electrolyte, and becoming dissolved in such electrolyte. The dissolved sulfur combines with the finely-divided heavy metal or metals, or with the finely-divided oxid or oxids of such metal or metals, forming the desired sulphide or sulphides.

As an example of the case first mentioned, where the metal of the electrolyte constitutes the metal of the sulphide obtained, I will give the following:

10 pounds of caustic soda are dissolved in from 5 to 6 gallons of water, either cold or warm. Through this solution I pass a direct current which at the beginning of the operation may be of 4 volts and 20 amperes, but as the operation progresses the amperage will drop and the voltage rise, so that at the end of the operation the voltage will be, for example, 10, and the amperage from 5 to 6. After the passage of the current has begun, I spread on the surface of the liquid, 4 pounds of sulfur in finely-divided form, and continue the passing of the electric current for a period of from 10 to 12 hours. Heating is not required during the electrolytic treatment, but is permissible. The electrolytic reaction may be expressed, presumably, by the following equation:

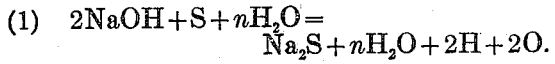

(1) $2NaOH + S + nH_2O = Na_2S + nH_2O + 2H + 2O.$

The result of the treatment, in this particular case, will be the formation of a sodium sulphide lye. This may be used as such, or may be further treated in any well-known or approved manner to obtain sodium sulphide.

The following may serve as an example of a case where the metal of the sulphide obtained is not the metal of the electrolyte:

As in the first example, 10 pounds of caustic soda are dissolved in from 5 to 6 gallons of water, and a current of initially 4 volts and 20 amperes is passed through the liquid for about from 10 to 12 hours, the voltage rising and the amperage falling until at the end the current is of, for example, 10 volts and 5 or 6 amperes. As in the first example, I spread 4 pounds of sulfur on the surface of the liquid after the passage of the current has begun. On the bottom of the vessel or vat, I spread, either before or soon after the passage of the current has begun, but before the sulfur is spread on the surface of the electrolyte, 10 pounds of finely-divided lead oxid (litharge), or an equivalent amount of finely-divided lead. No heating is required, although it may be used if desired. The electrolytic reaction may be expressed, presumably, by the equation (2) $2NaOH + nH_2O + S + PbO = PbS + Na_2S + nH_2O + 2H + 3O$ As a result of the treatment in this second example of my invention, I obtain lead sulphide which, being insoluble in the liquid present, will settle at the bottom. There is obtained, at the same time, a certain amount of sodium sulphide lye, as in the first example. The lead sulphide is separated in any suitable manner from such lye, washed, and dried. The lead sulphide thus obtained is suitable for a variety of uses, and forms a very efficient detector for wireless telegraphy or telephony. The sulphide lye may be utilized as pointed out in connection with the first example.

In each case, a direct current of initially about 4 volts and 20 amperes is employed, preferably. The current density depends on the concentration of the electrolyte.

I claim as my invention:

1. The process of producing sulphides, which consists in passing an electric current through a solution of a hydrate of an alkali or through a solution of a hydrate of an alkaline earth, spreading comminuted sulfur on top of said solution, and continuing the passage of such current until the sulfur forms a sulphide.

2. The process of producing sulphides, which consists in bringing comminuted sulfur in contact with a solution of a hydrate of an alkali or with a solution of a hydrate of an alkaline earth, and passing an electric current through such solution until the sulfur forms a sulphide.

3. The process of producing sulphides, which consists in bringing comminuted sulfur in contact with an electrolyte embodying a solution of a hydrate of an alkali or a solution of a hydrate of an alkaline earth, and passing an electric current through such electrolyte until the sulfur combines with the metal of said solution to form a sulphide of such metal.

4. The process of producing sulphides, which consists in passing an electric current through an electrolyte which is in contact with comminuted sulfur and with comminuted material containing a heavy metal, said electrolyte embodying a solution of a hydrate of an alkali or a solution of a hydrate of an alkaline earth, and continuing the passage of such current until the sulfur combines with the metal of the solution to form a sulphide of such metal and also combines with the heavy metal to form a sulphide thereof.

5. The process of producing sulphides, which consists in passing an electric current through an electrolyte which embodies a solution of a hydrate of an alkali or a solution of a hydrate of an alkaline earth, while such electrolyte is in contact with comminuted sulfur and with comminuted material containing a metal other than the metal of said solution, and continuing the passage of the electric current until the sulfur combines with the metal of the solution to form a sulphide of such metal and also combines with said other metal to form a sulphide thereof.

6. The process of producing sulphides, which consists in placing comminuted material containing a heavy metal, at the bottom of an electrolyte embodying a solution of a hydrate of an alkali or a solution of a hydrate of an alkaline earth, spreading comminuted sulfur on top of said electrolyte, and passing an electric current through such electrolyte until the sulfur combines with the metal of said solution to form a sulphide of such metal and also combines with the heavy metal to form a sulphide thereof.

In testimony whereof, I have signed this specification.

RICHARD RODRIAN.